United States Patent
Polk

(10) Patent No.: US 8,412,804 B2
(45) Date of Patent: *Apr. 2, 2013

(54) ACQUIRING INFORMATION IN A COMMUNICATION NETWORK RELATIVE TO A LOCATION

(75) Inventor: James M. Polk, Colleyville, TX (US)

(73) Assignee: Cisco Technology, Inc., San Jose, CA (US)

( * ) Notice: Subject to any disclaimer, the term of this patent is extended or adjusted under 35 U.S.C. 154(b) by 698 days.

This patent is subject to a terminal disclaimer.

(21) Appl. No.: 11/327,151

(22) Filed: Jan. 6, 2006

(65) Prior Publication Data

US 2007/0025339 A1     Feb. 1, 2007

Related U.S. Application Data

(60) Provisional application No. 60/704,092, filed on Jul. 29, 2005.

(51) Int. Cl.
   *G01C 21/34* (2006.01)
(52) U.S. Cl. ........ 709/221; 370/352; 701/202; 701/209; 701/213; 707/102; 340/995
(58) Field of Classification Search .................. 709/223, 709/201
   See application file for complete search history.

(56) References Cited

U.S. PATENT DOCUMENTS

| | | | |
|---|---|---|---|
| 5,930,699 A * | 7/1999 | Bhatia | 455/456.3 |
| 6,049,711 A | 4/2000 | Ben-Yehezkel et al. | |
| 6,061,560 A | 5/2000 | Saboorian et al. | |
| 6,285,317 B1 * | 9/2001 | Ong | 342/357.13 |
| 6,321,158 B1 * | 11/2001 | DeLorme et al. | 701/201 |
| 6,336,074 B1 * | 1/2002 | Woo | 701/208 |
| 6,345,294 B1 | 2/2002 | O'Toole et al. | |
| 6,385,615 B1 | 5/2002 | Haeri et al. | |
| 6,459,782 B1 * | 10/2002 | Bedrosian et al. | 379/201.08 |
| 6,496,776 B1 * | 12/2002 | Blumberg et al. | 701/213 |
| 6,529,894 B1 | 3/2003 | Haeri et al. | |
| 6,545,596 B1 | 4/2003 | Moon | |
| 6,609,005 B1 * | 8/2003 | Chern | 455/457 |

(Continued)

FOREIGN PATENT DOCUMENTS

| EP | 1 343 287 | 9/2003 |
|---|---|---|
| EP | 1343287 A2 * | 9/2003 |

(Continued)

OTHER PUBLICATIONS

Dynamic Host Configuration Protocol Option for Coordinate-based Location Configuration Information, J. Polk, pp. 1-3.*

(Continued)

*Primary Examiner* — Ashok Patel
*Assistant Examiner* — Andrew Goldberg

(57) ABSTRACT

A technique for providing information relative to an entity's location to an entity in a communication network. A request for information is generated by a first entity wherein the request contains a location of the first entity. The request is then forwarded to a second entity which illustratively is a trusted source in the communication network. The second entity receives the request and identifies the requested information using the location information contained in the request. A notification containing the identified information is then generated by the second entity and forwarded to the first entity. The first entity receives the notification and processes it accordingly.

10 Claims, 7 Drawing Sheets

U.S. PATENT DOCUMENTS

| | | | |
|---|---|---|---|
| 6,665,611 B1 | 12/2003 | Oran et al. | |
| 6,680,998 B1 | 1/2004 | Bell et al. | |
| 6,704,406 B1 | 3/2004 | Pearce et al. | |
| 6,721,580 B1 | 4/2004 | Moon | |
| 6,744,858 B1 | 6/2004 | Ryan et al. | |
| 6,754,335 B1 | 6/2004 | Shaffer et al. | |
| 6,757,723 B1 | 6/2004 | O'Toole et al. | |
| 6,775,833 B1 | 8/2004 | Gits et al. | |
| 6,779,154 B1 | 8/2004 | Nussbaum et al. | |
| 6,806,814 B1 | 10/2004 | Iverson et al. | |
| 6,826,472 B1 * | 11/2004 | Kamei et al. | 701/202 |
| 6,874,084 B1 * | 3/2005 | Dobner et al. | 713/156 |
| 6,907,254 B1 | 6/2005 | Westfield | |
| 6,940,954 B1 | 9/2005 | Toebes et al. | |
| 6,952,800 B1 | 10/2005 | Danner et al. | |
| 6,987,977 B2 | 1/2006 | Lockhart | |
| 7,079,850 B2 * | 7/2006 | Cameron | 455/456.1 |
| 7,123,693 B2 | 10/2006 | Nelson et al. | |
| 7,602,886 B1 | 10/2009 | Beech et al. | |
| 2001/0005809 A1 | 6/2001 | Ito | |
| 2001/0051852 A1 | 12/2001 | Sundaravel et al. | |
| 2002/0000999 A1 | 1/2002 | McCarty et al. | |
| 2002/0047787 A1 * | 4/2002 | Mikkola et al. | 340/995 |
| 2002/0056042 A1 * | 5/2002 | van der Kaay et al. | 713/178 |
| 2002/0133573 A1 | 9/2002 | Matsuda et al. | |
| 2003/0036848 A1 * | 2/2003 | Sheha et al. | 701/209 |
| 2003/0055723 A1 | 3/2003 | English | |
| 2003/0078035 A1 * | 4/2003 | Sheha et al. | 455/414 |
| 2003/0095520 A1 | 5/2003 | Aalbers et al. | |
| 2003/0140056 A1 | 7/2003 | Wall et al. | |
| 2003/0218064 A1 * | 11/2003 | Conner et al. | 235/439 |
| 2004/0088346 A1 * | 5/2004 | Hassler et al. | 709/201 |
| 2004/0148091 A1 * | 7/2004 | Masclet et al. | 701/200 |
| 2004/0192339 A1 * | 9/2004 | Wilson et al. | 455/456.1 |
| 2004/0259545 A1 | 12/2004 | Morita | |
| 2005/0083911 A1 | 4/2005 | Grabelsky et al. | |
| 2005/0111630 A1 | 5/2005 | Potorny et al. | |
| 2005/0138144 A1 | 6/2005 | Sethi | |
| 2005/0153697 A1 | 7/2005 | Patel | |
| 2005/0195960 A1 | 9/2005 | Shaffer et al. | |
| 2005/0213716 A1 | 9/2005 | Zhu et al. | |
| 2005/0235056 A1 | 10/2005 | Chen et al. | |
| 2005/0253718 A1 | 11/2005 | Droms et al. | |
| 2006/0063539 A1 * | 3/2006 | Beyer, Jr. | 455/456.3 |
| 2006/0193446 A1 | 8/2006 | Colunga | |
| 2007/0025337 A1 | 2/2007 | Polk | |
| 2007/0025339 A1 | 2/2007 | Polk | |
| 2007/0027997 A1 * | 2/2007 | Polk | 709/230 |
| 2007/0050128 A1 * | 3/2007 | Lee et al. | 701/200 |

FOREIGN PATENT DOCUMENTS

| | | | |
|---|---|---|---|
| GB | 2278196 A | * | 11/1994 |
| JP | 2002 116033 A | | 4/2002 |
| WO | WO 01/90920 A2 | | 11/2001 |

OTHER PUBLICATIONS

James M. Polk, Requirements for Session Initiation Protocol Location Conveyance, Feb. 9, 2003, IETF draft.*

Polk et al., "Dynamic Host Configuration Protocol Option for Coordinate-based Location Configuration Information", RFC 3825, Jul. 2004, pp. 1-32.*

International Search Report dated Oct. 20, 2006 issued in related international application No. PCT/US2006/023855.

Office Action Mail Date Mar. 17, 2009, U.S. Appl. No. 11/327,152.

Office Action Mail Date Feb. 25, 2009, U.S. Appl. No. 11/263,750.

Office Action Mail Date Mar. 31, 2009, U.S. Appl. No. 11/496,272.

Office Action Mail Date Jul. 23, 2009, U.S. Appl. No. 11/327,152.

Final Office Action Mail Date Oct. 14, 2009, U.S. Appl. No. 11/496,272.

Office Action Mail Date Aug. 28, 2008, U.S. Appl. No. 11/263,750.

Office Action Mail Date Nov. 7, 2008, U.S. Appl. No. 11/327,152.

Office Action Mail Date Nov. 17, 2009, U.S. Appl. No. 11/263,750.

Final Office Action Mail Date Dec. 30, 2009, U.S. Appl. No. 11/327,152.

Office Action Mail Date, Apr. 20, 2010, U.S. Appl. No. 11/327,152.

Final Office Action Mail Date, Apr. 29, 2010, U.S. Appl. No. 11/263,750.

Polk, J., et al., "Session Initiation Protocol Location Conveyance", *Internet Engineering Task Force (IETF)*, draft-ietf-sip-location-conveyance-01.txt, Jul. 17, 2005, pp. 1-73.

Peterson, J., "A Presence-based GEOPRIV Location Object Format", *IETF*, draft-ietf-geopriv-pidf-lo-03, Sep. 9, 2004, pp. 1-24.

Schulzrinne, H., "Dynamic Host Configuration Protocol (DHCPv4 and DHCPv6) Option for Civic Addresses Configuration Information", *IETF*, draft-ietf-geopriv-dhcp-civil-06, May 30, 2005, pp. 1-21.

Berners-Lee, T., "Universal Resource Identifiers in WWW", Request for Comments (RFC) 1630, *IETF*, Jun. 1994, pp. 1-28.

Droms, R., "Dynamic Host Configuration Protocol", RFC 2131, *IETF*, Mar. 1997, pp. 1-45.

Polk, J., et al., "Dynamic Host Configuration Protocol Option for Coordinate-based Location Configuration Information", RFC 3825, *IETF*, Jul. 2004, pp. 1-15.

O'Tuathail, E., et al., "Using the Simple Object Access Protocol (SOAP) in Blocks Extensible Exchange Protocol (BEEP)", RFC 3288, *IETF*, Jun. 2002, pp. 1-20.

Roach, A. B., "Session Initiation Protocol (SIP)—Specific Event Notification", RFC 3265, *IETF*, Jun. 2002, pp. 1-38.

Shulzrinne, H., et al., "RTP: A Transport Protocol for Real-Time Applications", RFC 3550, *IETF*, Jul. 2003, pp. 1-104.

Rosenberg, J., et al., "SIP: Session Initiation Protocol", RFC 3261, *IETF*, Jun. 2002, pp. 1-269.

Office Action mailed Mar. 31, 2009 in co-pending U.S. Appl. No. 11/496,272.

Office Action mailed Oct. 14, 2009 in co-pending U.S. Appl. No. 11/496,272.

Office Action mailed May 20, 2011 in co-pending U.S. Appl. No. 11/496,272.

Polk, James M., "Requiremnets for Session Initiation Protocol Location Conveyance," IETF, Feb. 9, 2003.

Office Action mailed Oct. 31, 2011 in co-pending U.S. Appl. No. 11/496,272.

* cited by examiner

ACQUIRING INFORMATION IN A COMMUNICATION NETWORK RELATIVE TO A LOCATION

RELATED APPLICATION

This application claims the benefit of U.S. Provisional Application No. 60/704,092, entitled "Acquiring Information Relative To A Location In A Communication Network," by James M. Polk, filed on Jul. 29, 2005, the entire teachings of which are incorporated herein by reference.

FIELD OF THE INVENTION

This invention relates to communication networks and in particular to acquiring information in a communication network relative to a location.

BACKGROUND OF THE INVENTION

A communication network is a geographically distributed collection of nodes interconnected by communication links and segments for transporting communications (e.g., data) between communication units (end nodes), such as personal computers, certain telephones, personal digital assistants (PDAs), video units and the like. Many types of communication networks are available, with the types ranging from local area networks (LANs) to wide area networks (WANs). LANs typically connect nodes over dedicated private communication links located in the same general physical location, such as a building or campus. WANs, on the other hand, typically connect large numbers of geographically dispersed nodes over long-distance communication links, such as common carrier telephone lines. The Internet is an example of a WAN that connects various networks throughout the world, providing global communication between nodes in the various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

A communication network may comprise a series of intermediate nodes (e.g., routers) that are configured to carry communications through the network to the end nodes. Routers are often configured to "route" data, such as packets, between various nodes in the network. Routing is typically performed at layer-3 (L3), which is the network layer of the Open Systems Interconnection Reference Model (OSI-RM). Routers often maintain forwarding databases (FDBs), which are typically configured to hold routing information including L3 addresses and interface information that the router uses to determine where data (e.g., data packets) are to be forwarded in order to reach their destination. For example, a router may have a routing database containing one or more entries wherein each entry contains an L3 destination address of a destination node and interface information about an interface on the router through which the destination node may be reached. A data packet containing a destination address that matches a destination address of an entry in the routing table is forwarded by the router to the interface specified by the matching entry for transfer to the destination node.

A router may execute one or more routing protocols that enable the router to route packets and exchange routing information with other routers in the network. The routers often use this information to configure (e.g., compute) their FDBs. The routing protocols may include distance-vector protocols, such as the Routing Information Protocol (RIP), or link-state protocols, such as the Intermediate-System-to-Intermediate-System (IS-IS) protocol and the Open Shortest Path First (OSPF) protocol.

Routing information is typically exchanged between the routers in the form of advertisement messages. For example, nodes executing the IS-IS protocol exchange routing information using an advertisement message called a Link State Packet (LSP). Likewise, nodes executing the OSPF protocol exchange routing information using an advertisement message called a Link State Advertisement (LSA). An intermediate node that acquires an advertisement message may use information contained therein to update its FDB.

Communication networks are increasingly being used to transport many forms of information including, e.g., voice and video information. Information may be carried on a communication network using various technologies, such as Voice over IP (VoIP). VoIP refers to a group of technologies that may be used to transmit e.g., voice information over communication networks from a source (calling party) to a destination (called party). Such networks may include a plurality of agents that convert e.g., voice and/or video information from its traditional form to a form that is suitable for packet transmission. In other words, the agent encodes, compresses and encapsulates the information into a plurality of data packets that are suitable for being carried by the communication network. Examples of agents include IP telephones, VoIP network interfaces, certain private branch exchanges (PBXs), personal computers (PCs) running communication applications, certain personal digital assistants (PDAs), network devices providing voice gateway services and so on.

In certain communication networks, such as VoIP networks and various IP networks, a session protocol may be employed to establish a session (connection) that supports a call between a calling party and a called party. An example of a session protocol that is commonly used is the well-known Session Initiation Protocol (SIP) which is described in J. Rosenberg et al., "SIP: Session Initiation Protocol," Internet Engineering Task Force (IETF) Request For Comments (RFC) 3261. SIP operates at the application layer of the OSI-RM and is defined to establish and maintain sessions between endpoints (e.g., SIP-based telephones) in a communication network.

In accordance with SIP, endpoints are referred to as User Agents (UAs). When a UA comes on-line, it typically registers with a registration service, called a policy data point (PDP), using a SIP message containing a SIP "register" (REGISTER) command. The PDP maintains information about the UA which may include its location, how to reach it and authentication information associated with the UA that may be used to authenticate the UA. Typically, after a UA is registered, the UA is available to receive as well as initiate calls.

At the beginning of a call, a session is typically established between the UAs of the call's calling and called parties to support the call. Establishing a session between the parties often involves (a) authenticating both parties and (b) successfully exchanging a sequence of messages between the parties in a predetermined manner. Authentication usually involves ensuring the parties have permission to establish the call. The sequence of messages typically includes an invite (INVITE) message issued by the calling party to the called party, an acknowledgement ("200 OK") message issued by the called party to the calling party followed by an acknowledgement (ACK) message issued by the calling party to the called party. After the session is established, a channel may then be set up, e.g., in accordance with the Real-time Transport Protocol (RTP) described in H. Schulzrinne et al., "RTP: A Transport Protocol for Real-Time Applications," IETF RFC 3550, to carry traffic (e.g., voice information) between the parties.

Some communication networks, such as IP based communication networks, enable an entity, such as a communication unit, to learn its geographic location from a server. Here, the server may employ triangulation or other methods to determine the communication unit's geographic location. The communication unit may then learn its location by issuing a request to the server to which the server responds with the geographic location. For example, an extension to the Dynamic Host Configuration Protocol (DHCP) that may be used to provide a communication unit's geographic location information to the communication unit using DHCP is described in J. Polk et al., "Dynamic Host Configuration Protocol Option for Coordinate-based Location Configuration Information," IETF RFC 3825. Here, a communication unit requests its location information from a DHCP server using a DHCP request message. The server responds to the request with a DHCP response message that contains the communication unit's geographic location in the form of an option contained in the DHCP response message.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
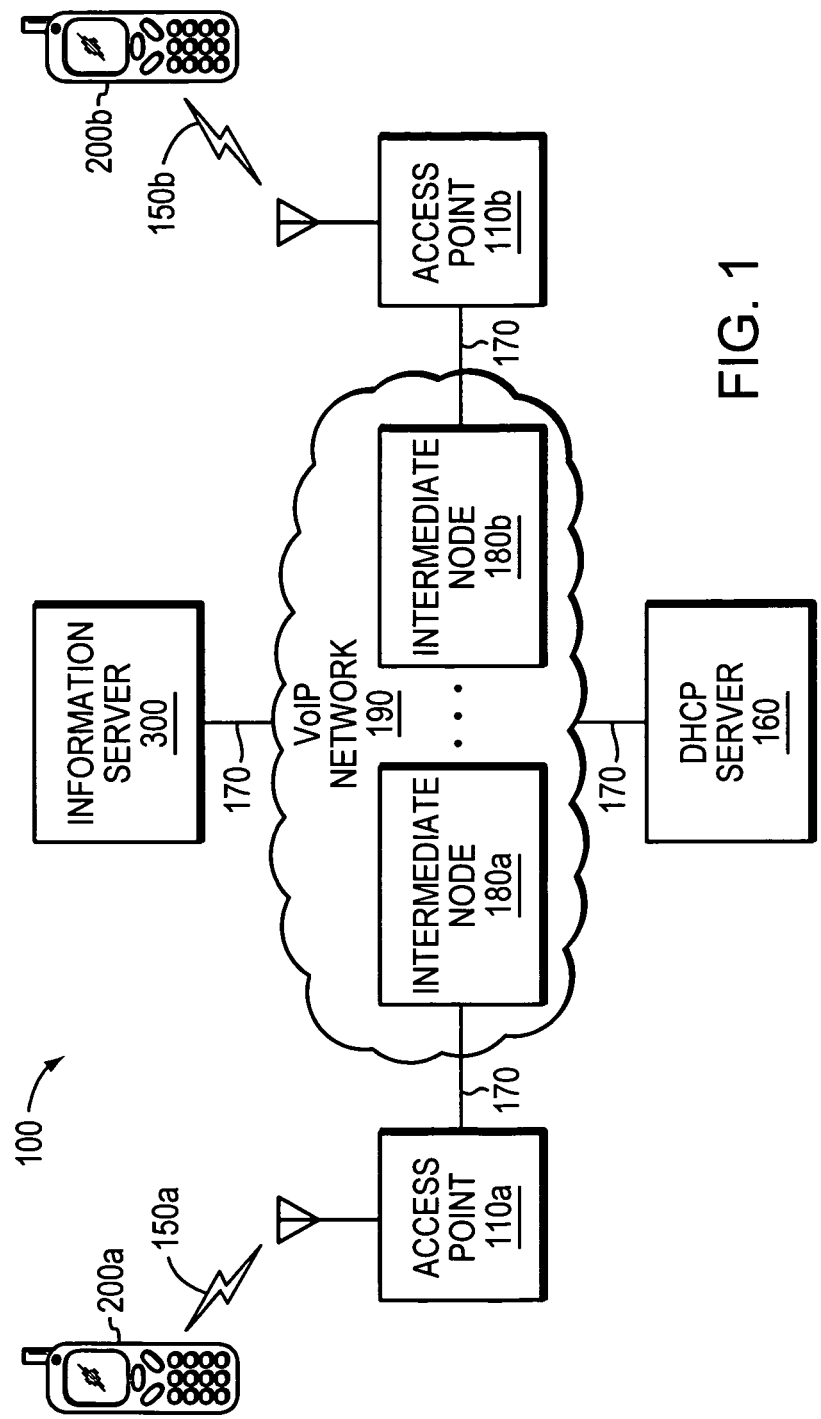
FIG. 1 is a block diagram of an exemplary communications network that may implement the present invention.

A description of preferred embodiments of the invention follows.

It should be noted, illustrated embodiments of the present invention, described herein, are described as using the Session Initiation Protocol (SIP) to establish and maintain sessions in a communication network as well as exchange information in the network. A version of the SIP protocol that may be used with the present invention is described in J. Rosenberg et al., "SIP: Session Initiation Protocol," RFC 3261, June 2002, available from the Internet Engineering Task Force (IETF) and is incorporated by reference in its entirely as though fully set forth herein. It should be noted that other protocols, such as the Simple Object Access Protocol (SOAP), Hypertext Transfer Protocol (HTTP), File Transfer Protocol (FTP) and Simple Mail Transfer Protocol (SMTP), may take advantage of aspects of the present invention.

One problem with some communication networks, especially IP-based communication networks, is that although an entity (e.g., a communication unit) may be able to determine its geographic location using the network, it may not be able to determine certain ancillary information relative to its geographic location. For example, Public Safety Access Points (PSAPs) are agencies that are responsible for answering calls for emergency assistance from various organizations, such as police, fire and ambulance services, in a certain geographical area. In some IP networks, a PSAP is typically associated with a Uniform Resource Identifier (URI) which is used to establish communications (e.g., a telephone call) with the PSAP. Current day IP networks do not provide URI information of entities to a requesting entity relative to the requesting entity's location. Thus, in the PSAP example, it is possible for the entity to have a URI for a PSAP that does not service the entity's geographic location. This could pose undue risk to life and property in the event of an emergency situation.

The present invention overcomes shortcomings associated with the prior art by providing ancillary information to an entity in a communication network that is relative to the entity's location. According to an aspect of the present invention, a request for the ancillary information is generated by a first entity wherein the request contains a location of the first entity. The request is forwarded to a second entity in the communication network which is, illustratively, a "trusted source" meaning that the first entity considers the second entity a trustworthy source of information. The second entity (a) receives the request, (b) locates the ancillary information using the location information contained in the request, (c) generates a response containing the located ancillary information and (d) forwards the response to the first entity. The first entity receives the response and processes it accordingly.

Advantageously, by providing ancillary information relative to an entity's location to the entity, the present invention enables information associated with the location of the entity, such as a location of a PSAP, to be provided to the entity. Further, advantageously, by providing the ancillary information from a trusted source, the entity may be assured that the provided information is correct.

FIG. 1 is a high-level block diagram of an exemplary communication network 100 that may implement the present invention. Communication network 100 comprises a collection of communication links 150, 170 interconnecting a plurality of nodes such as communication units 200, access points 110, Dynamic Host Configuration Protocol (DHCP) server 160, intermediate nodes 180 and information server 300 to form an internetwork of nodes. These internetworked nodes communicate by exchanging data packets according to a pre-defined set of network protocols, such as the Transmission Control Protocol/Internet Protocol (TCP/IP) and the SIP protocol. A network protocol as used herein is a formal set of rules that define how data is exchanged between nodes in a communication network.

The intermediate nodes 180 are conventional intermediate nodes, such as routers, that are configured to implement a VoIP network 190. The access points 110 contain logic that enable the communication units 200 to transfer information (e.g., data) between the VoIP network 190 and communication units 200. To that end, the access points 110 comprise circuitry which is configured to transmit and receive signals (e.g., radio frequency (RF) signals) that carry the information between the access points 110 and the communication units 200 via wireless links 150. Examples of access points that may be used with the present invention include certain Institute of Electrical and Electronic Engineers (IEEE) 802.11 compliant access points as well as certain cellular telephone wireless systems that support the transfer of e.g., data traffic.

Communication units 200 are conventional communication units, such as wireless telephones, personal digital assistants (PDAs), IP telephones and the like, that enable, e.g., audible and/or visual communications to be converted into signals that are transferred to the access points 110 via wireless links 150. The access points 110 interface the communication units 200 with the network 100 and enable signals be transferred between the communication units 200 and the network 100. Specifically, the access points 110 convert signals received from the communication units 200 via wireless links 150 into data packets that are transferred onto the network 100 as well as convert packets received from the network into signals that are transferred to the communication units 200. Information (e.g., voice, video) is typically conveyed between the communication units 200 using calls (e.g., telephone calls) which are established in network 100 between the communication units 200. It should be noted that the present invention may be adapted to work with fixed as well as mobile devices that are able to communicate via a communication network. These fixed devices may include telephone units, personal computers and the like that are wired to a network, such as an Ethernet network.

Figure 2:
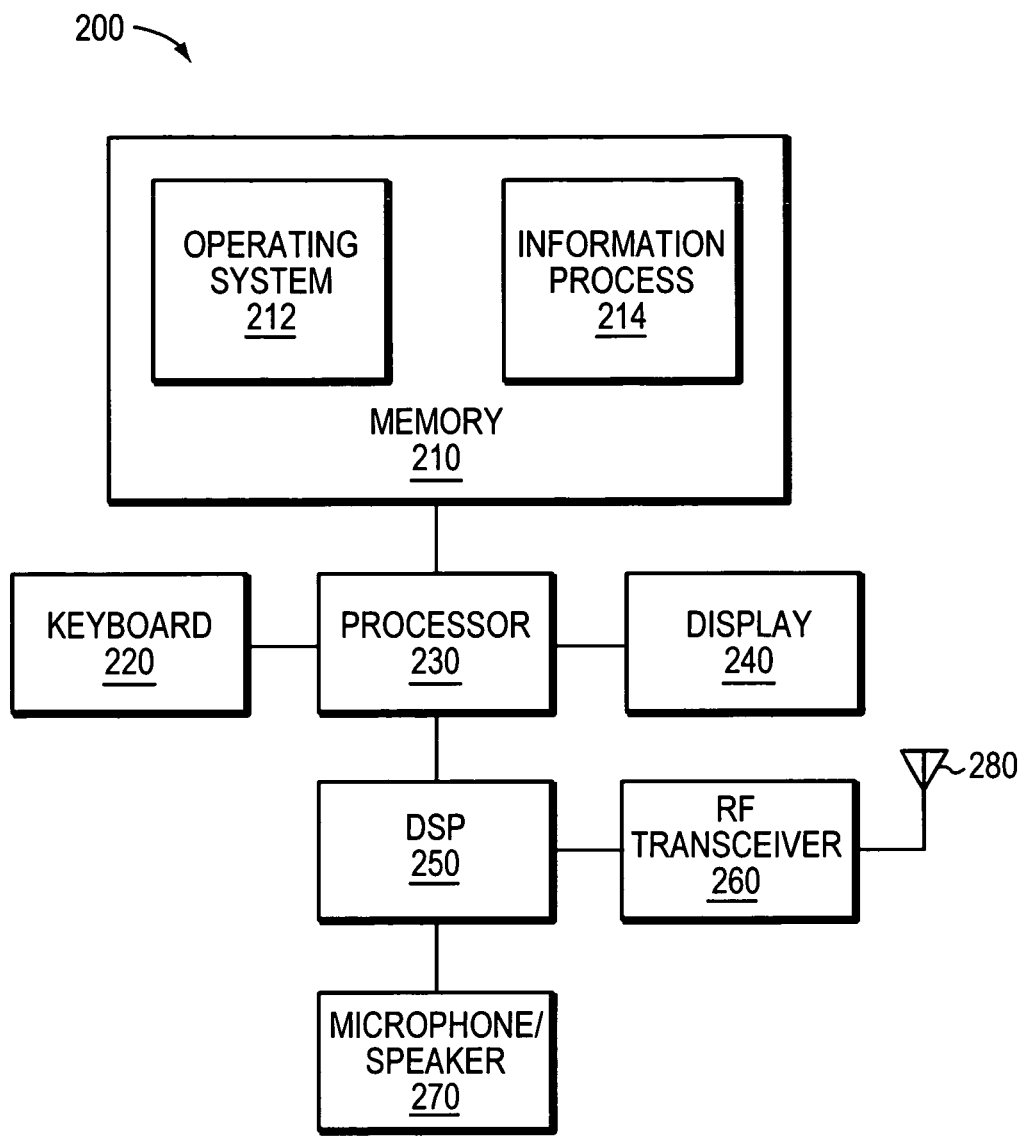
FIG. 2 is a block diagram of a communication unit that may be used with the present invention.

FIG. 2 is a high-level block diagram of an exemplary communication unit 200 that may be used with the present invention. Communication unit 200 comprises a memory 210, a keyboard 220, a CPU 230, a display unit 240, a digital signal processor (DSP) 250, an RF transceiver 260, a microphone/speaker 270 and an antenna 280. The keyboard 220 is a conventional keyboard device that enables information to be input into the communication unit by, e.g., a user. The processor 230 is a conventional central processing unit (CPU) configured to execute computer-executable instructions contained in memory 210 including instructions that implement aspects of the present invention.

The display unit 240 is a conventional display unit that enables images (e.g, text, icons, pictures) to be displayed on the communication unit 200. The DSP 250 is a conventional digital signal processor that is capable of processing various analog and/or digital signals generated by e.g., the RF transceiver 260 and microphone/speaker 270 as well as providing various digital and/or analog signals to the microphone/speaker 270 and the RF transceiver 260.

The RF transceiver 260 is a conventional RF transceiver that acts as a network interface, and enables signals to be transferred between the network 100 and the communication unit 200 via antenna 280. The microphone/speaker 270 comprises logic that enables audio to be input into the communication unit 200 as well as output from the communication unit 200.

The memory 210 is a computer-readable medium implemented as a random access memory (RAM) comprising RAM devices, such as dynamic RAM (DRAM) devices and/or flash memory devices. Memory 210 contains various software and data structures used by processor 230 including software and data structures that implement aspects of the present invention. Specifically, memory 210 includes an operating system 212 and an information process 214. The operating system 212 functionally organizes the communication unit 200 by invoking operations in support of software processes and services executing on the communication unit 200, such as information process 214. Information process 214, as will be described further below, comprises computer-executable instructions to (a) generate requests for ancillary information relative to the communication unit's location, (b) forward the requests to the information server 300 and (c) process responses (e.g., notifications) to the requests received from the information server 300.

Information server 300 is a conventional server that (a) processes requests for information received from nodes in the network (e.g., communication units 200), (b) generates responses (e.g., notifications) containing the requested information and (c) forwards the responses to the appropriate nodes. Illustratively, information server 300 is a "trusted source" meaning that the nodes in the network consider the server 300 as a reliable (trustworthy) source of information.

Figure 3:
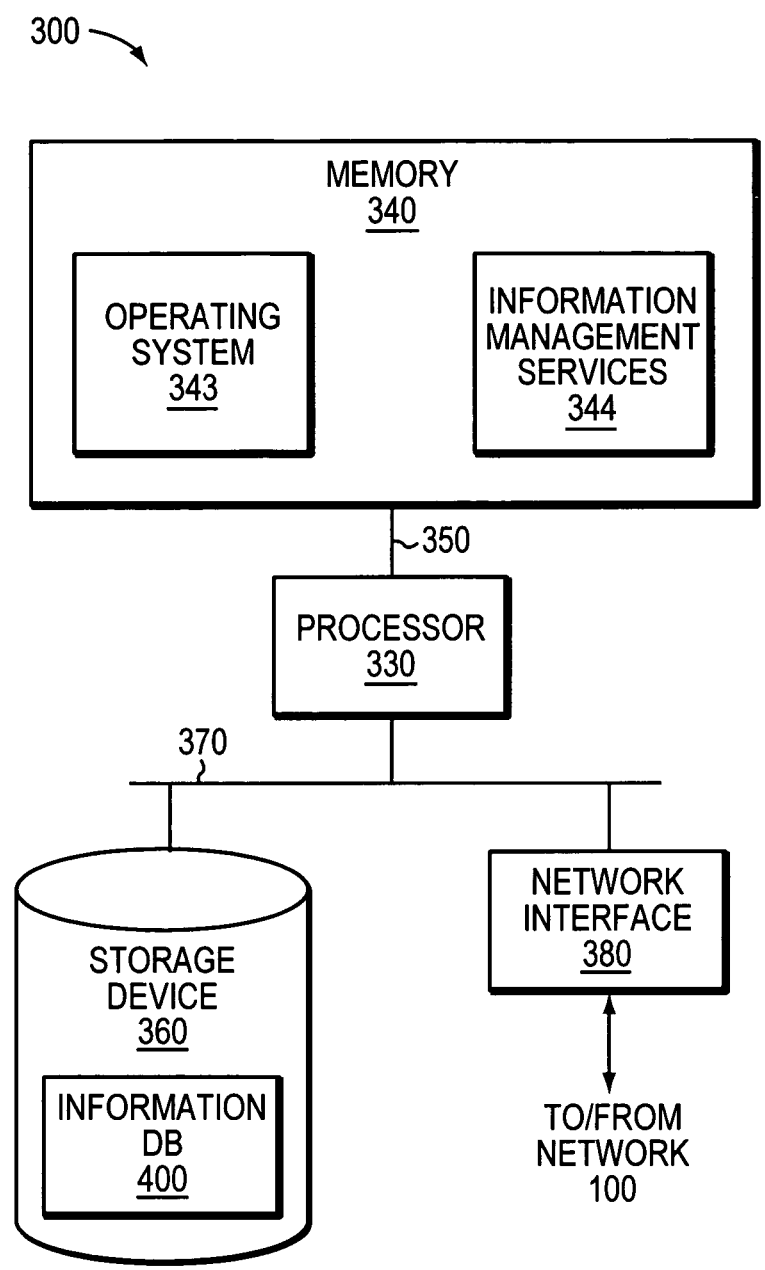
FIG. 3 is a block diagram of a server that may be used with the present invention.

FIG. 3 is a high-level block diagram of an exemplary information server 300 that may be used with the present invention. Server 300 comprises a memory 340 coupled to a processor 330 via a memory bus 350 and, a storage device 360 and a network interface 380 coupled to the processor 330 via an input/output (I/O) bus 370. It should be noted that server 300 may include other devices, such as keyboards, display units and the like. The network interface 380 interfaces the server 300 with the network 100 and enables data (e.g., packets) to be transferred between the server 300 and other nodes in the network 100. To that end, network interface 380 comprises conventional interface circuitry that incorporates signal, electrical and mechanical characteristics, and interchange circuits, needed to interface with the physical media of the network 100 and protocols running over that media. Storage device 360 is a conventional storage device (e.g., a disk) capable of storing, inter alia, ancillary information associated with locations (e.g., geographic locations). This information may include, for example, a Uniform Resource Identifier (URI) or Uniform Resource Locator (URL) associated with PSAPs that service particular locations.

The memory 340 is a computer-readable medium implemented as a RAM comprising RAM devices, such as DRAM devices and/or flash memory devices. Memory 340 contains various software and data structures used by the processor 330 including software and data structures that implement aspects of the present invention. Specifically, memory 340 includes an operating system 343 and information management services 344. The operating system 343 functionally organizes the translation server 300 by invoking operations in support of software processes and services executing on the server 300, such as information management services 344. Information management services 344, as will be described further below, comprises computer-executable instructions to process requests for location information in accordance with an aspect of the present invention.

Figure 4:
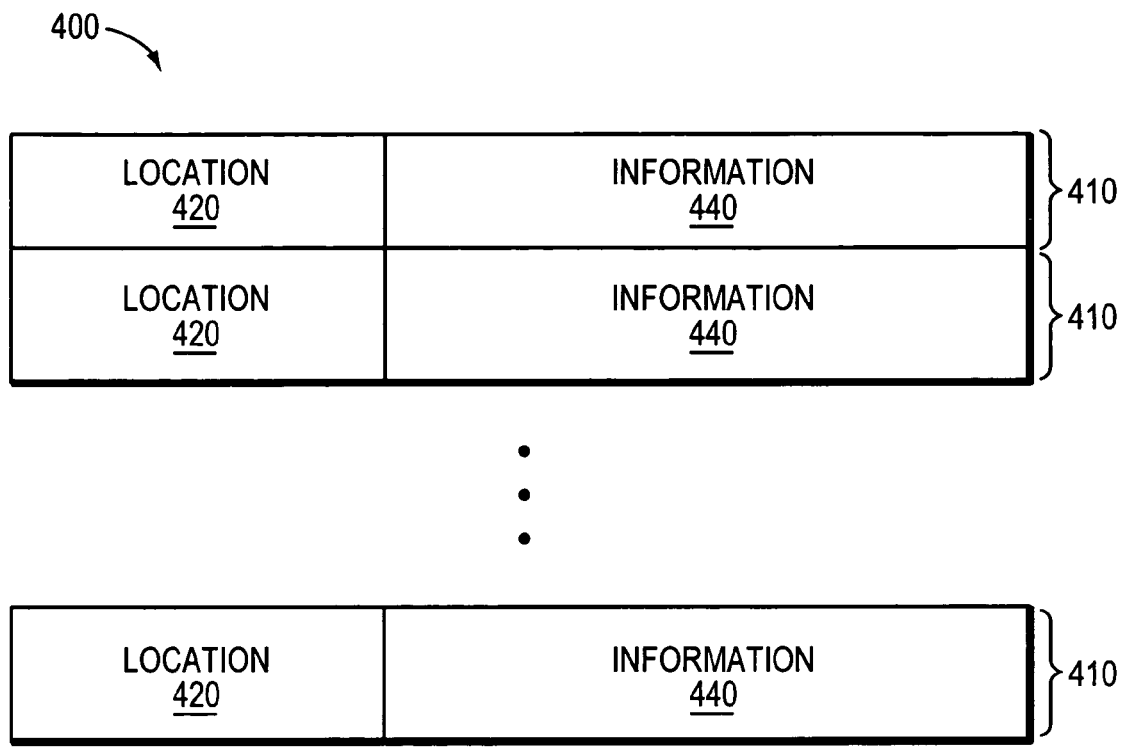
FIG. 4 illustrates an information database that may be used with the present invention.

Storage device 360 comprises information database (DB) 400 which is a data structure that is configured to hold various information requested by the communication units 200 including ancillary information that is related to a communication unit's location. FIG. 4 illustrates an information DB 400 that may be used with the present invention. Information DB 400 is illustratively a table comprising one or more entries 410 wherein each entry contains a location field 420 and an information field 440. The location field 420 holds information that represents a location (e.g., a geographic location) that may be associated with a communication unit 200 and the information field 440 holds ancillary information that is associated with the location represented in the location field 420. This information illustratively includes a URI associated with a PSAP that services the location represented in the location field 420. It should be noted that the information field may be used to hold other ancillary information relative to a location, such as a list of stores, restaurants, other places of interest and so on.

It should be noted that functions performed by communication units 200 and the information server 300, including functions that implement aspects of the present invention, may be implemented in whole or in part using some combination of hardware and/or software. It should be further noted that computer-executable instructions and/or computer data that implement aspects of the present invention may be stored in various computer-readable mediums, such as volatile memories, non-volatile memories, flash memories, removable disks, non-removable disks and so on. In addition, it should be noted that various electromagnetic signals, such as wireless signals, electrical signals carried over a wire, optical signals carried over optical fiber and the like, may be encoded to carry computer-executable instructions and/or computer data that implement aspects of the present invention on e.g., a communication network.

In accordance with an aspect of the present invention, DHCP server 160 may be preconfigured with information about the geographic location of entities (nodes) in network 100. An entity (e.g., a communication unit 200) may learn its geographic location from the server 160 by (a) generating a DHCP message to request the entity's geographic location and (b) forwarding the generated request to the DHCP server 160. The server responds to the request with a DHCP message that contains the geographic location of the entity. It should be noted that entities in network 100 may use other means to determine their geographic location, such as via a Global Positioning System (GPS) system, triangulation methods and the like.

Figure 5:
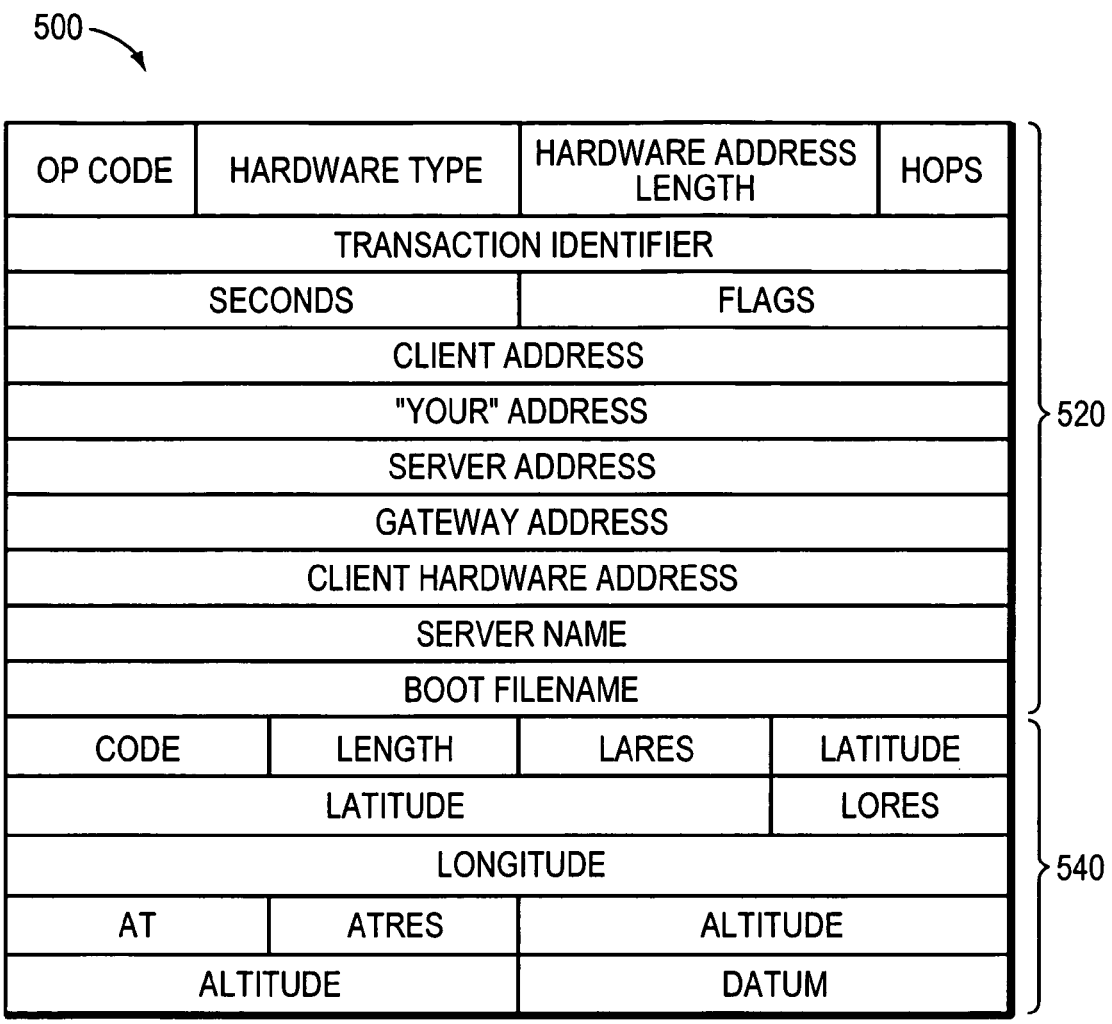
FIG. 5 illustrates a Dynamic Host Configuration Protocol (DHCP) message containing a DHCP option for coordinate location configuration information (LCI) that may be used with the present invention.

FIG. 5 is a block diagram of a DHCP message 500 that may be used with the present invention. Message 500 includes DHCP information 520 and a DHCP coordinate location configuration information (LCI) option 540. The DHCP information 520 contains conventional DHCP message fields including operation (OP) code, hardware type, hardware address length, hops, transaction identifier, seconds, flags, client address, "your" address, server address, gateway address, client hardware address, server name and boot filename fields.

The OP code field holds a value that indicates whether the message is a DHCP request message or a DHCP response message. The hardware type and hardware address length fields hold values that specify a type of hardware used to by the entity to access the network and a length of the hardware addresses in the message 500, respectively. The hops field holds a value that specifies hop information that may be used by various nodes to control the forwarding of the DHCP message 500.

The transaction identifier field holds a value that may be used to (1) identify a DHCP request and (2) match the request to a particular response. The seconds field holds a value that indicates a number of seconds that has elapsed since the entity began an attempt to acquire a lease of configuration information requested by a DHCP request. The flags field holds a value that indicates various flags associated with the request.

The client address field holds a value that represents an address (e.g., an IP address) associated with the entity. The "your" address field holds a value that represents an address assigned to the entity by the DHCP server. The server address field holds a value that represents an address (e.g., IP address) associated with the DHCP server. The gateway address field holds a value that represents an address associated with a gateway device that may be used by the entity to access various networks. The client hardware address field holds a value that represents a hardware address (e.g., a Media Access Control address) of the entity. The server name field holds a value of a name associated with the DHCP server and the boot filename field typically holds information regarding a boot file requested by the entity.

The option 540 contains a code field, a length field, a latitude resolution (LARES) field, a latitude field, a longitude resolution (LORES) field, a longitude field, an altitude type (AT) field, an altitude resolution (ATRES) field, an altitude field and a datum field which represent a coordinate location of the entity. It should be noted that message 500 may be configured to hold location information other than coordinate information of the entity, such as the postal address of the client.

The code field holds a value that identifies the option 540 as a coordinate LCI option. The length field holds a value that represents a length of the option 540, illustratively is bytes. The LARES field holds a value that represents the number of valid bits in a fixed-point value of the latitude contained in the latitude field. The latitude field holds a value that represents a latitude associated with the entity. The LORES field holds a value that represents a number of valid bits in a fixed-point value contained in the longitude field. The longitude field holds a value that represents a longitude associated with the entity. The AT field holds a value that represents an altitude type associated with the entity (e.g., meters, floors) altitude. The ATRES field holds a value that represents a precision associated with the value contained in the altitude field. The altitude field holds a value that represents an altitude of the entity. The datum field holds a value that represents information about the object 540, e.g., map datum was used for the coordinates given by this option 540.

A version of the DHCP protocol that may be used with the present invention is described in R. Droms, "Dynamic Host Configuration Protocol," RFC 2131, March 1997, and a DHCP option for coordinate LCI that may be used with the present invention is described in J. Polk et al. "Dynamic Host Configuration Protocol Option for Coordinate Based Location Configuration Information" RFC 3825, July 2004, both of which are available from the IETF and both of which are hereby incorporated by reference in their entirety as though fully set forth herein.

In accordance with an aspect of the present invention, information associated with the location of a communication unit is acquired using a query/response type protocol. An example of a query/response protocol that may be used with the present invention is the SIP protocol described in previously incorporated RFC 3261. Specifically, embodiments of the present invention utilize a subscribe/notify technique associated with the SIP SUBSCRIBE and NOTIFY commands to enable a communication unit 200 to acquire ancillary information related to the communication unit's location from the information server 300. A subscribe/notify technique which utilizes the SIP SUBSCRIBE and NOTIFY commands that may be used with the present invention is described in A. B. Roach, "Session Initiation Protocol (SIP)-Specific Event Notification," RFC 3265, available from the IETF, which is hereby incorporated by reference in its entirety as though fully set forth herein. It should be noted that, alternatively, a SIP OPTIONS technique that uses the SIP OPTIONS command to request information associated with the location of a communication unit and a corresponding SIP "200 OK" response message to return the requested information may be used with the present invention. A SIP OPTIONS technique that may be used with the present invention is described in RFC 3261.

Figure 6:
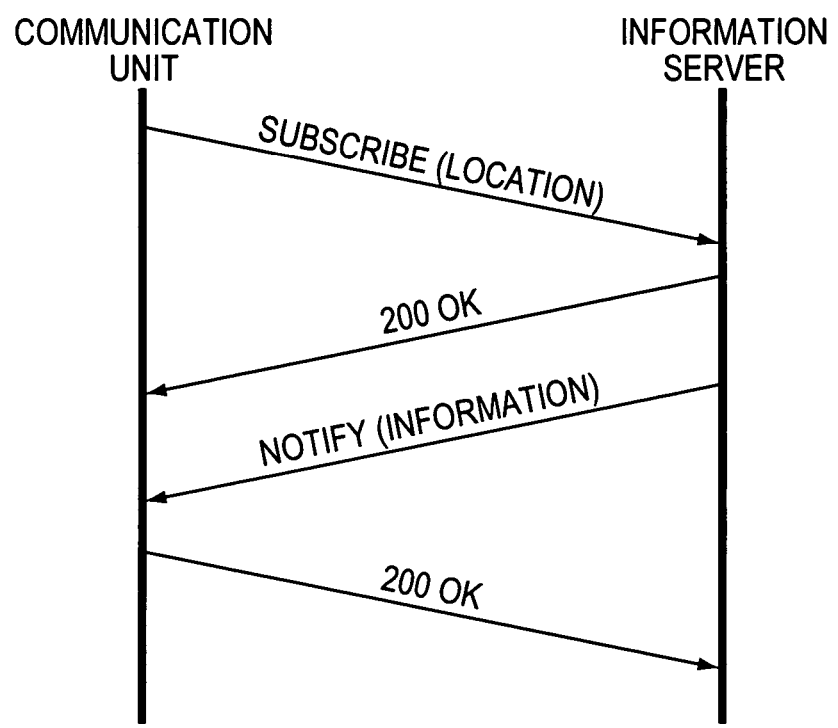
FIG. 6 illustrates dialogue between a communication unit and an information server in accordance with an aspect of the present invention.

FIG. 6 illustrates a dialogue between a communication unit 200 and the information server 300 using a subscribe/notify technique in accordance with an aspect of the present invention. The dialogue begins when a communication unit 200 generates and issues a "subscribe" message containing its location to the information server 300. The subscribe message acts as a request from the communication unit 200 for information from the information server 300 that relates to the location of the communication unit 200. The information server 300 acknowledges the subscribe message with a "200 OK" message. The information server 300 processes the subscribe message including locating the information requested in the message (e.g., ancillary information relating to the location of the communication unit 200). The information server 300 then generates a "notify" message that contains the information and transfers the message to the communication unit. The notify message acts as a response in that it contains the ancillary information requested in the subscribe message. The communication unit 200 receives the notify message and acknowledges the notify message by responding to the information server with a "200 OK" message.

It should be noted that in embodiments that utilize the SIP OPTIONS technique, the communication unit issues a SIP OPTIONS message to the server wherein the message contains the location of the entity and specifies that ancillary information related to the communication unit's location is being requested from the server. The server responds with a "200 OK" message that contains the requested ancillary information.

Figure 7:
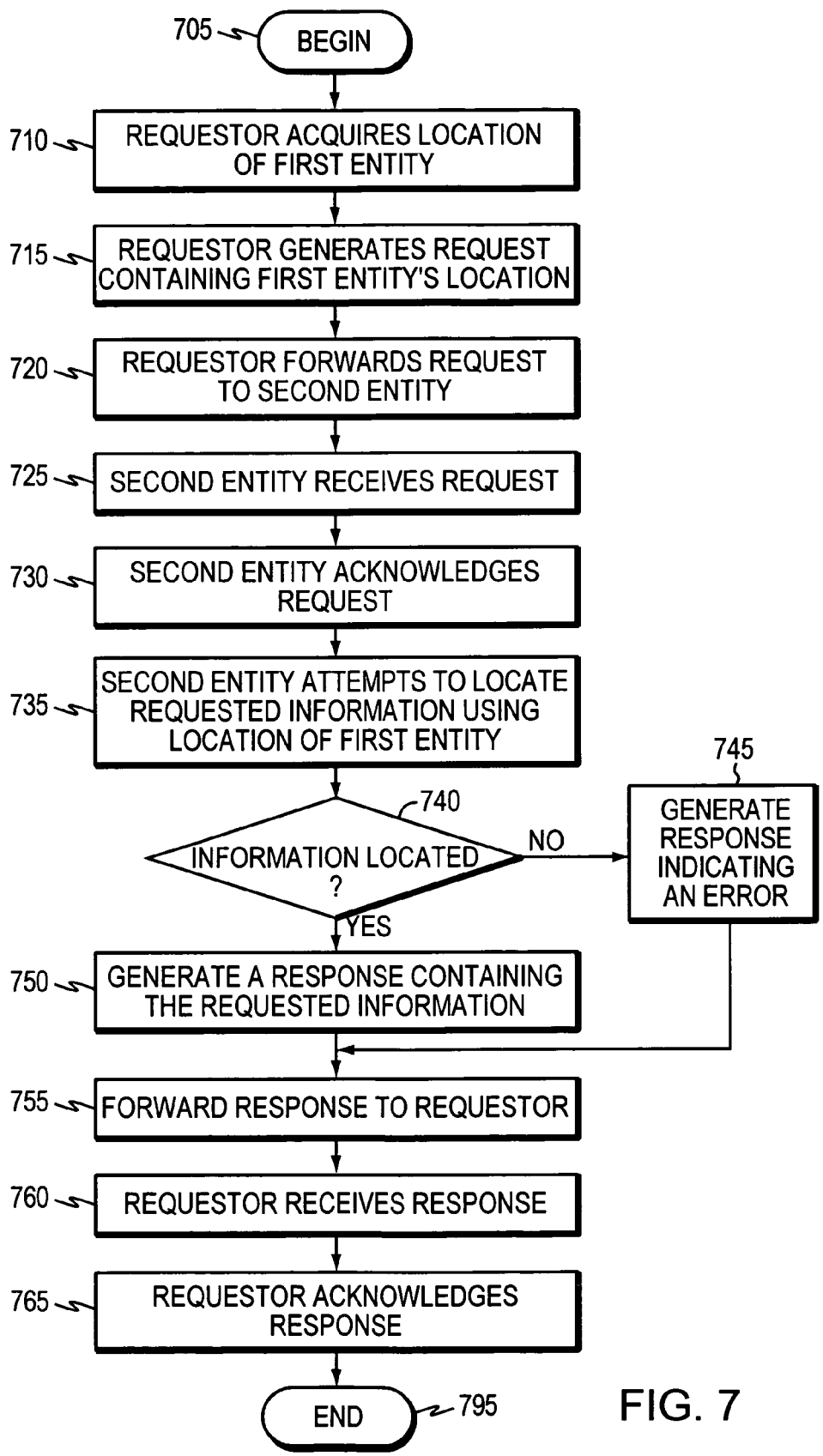
FIG. 7 is a flow chart of a sequence of steps that may be used to request ancillary information related to a location of a first entity from a second entity in accordance with an aspect of the present invention.

FIG. 7 is a flow chart of a sequence of steps that may be used to request ancillary information related to a location of a first entity (e.g., a communication unit 200) from a second entity (e.g., information server 300) in accordance with an aspect of the present invention. The sequence begins at step 705 and proceeds to step 710 where a requestor (e.g., the entity) acquires the location of the first entity. Illustratively, the location of the first entity may be acquired as described above using the DHCP protocol wherein the first entity sends a request for the location information to a DHCP server. The DHCP server responds with a DHCP response that contains e.g., the geographical location of the first entity as known to the DHCP server. Alternatively, the location of the first entity may be acquired using other means described above, such as via a GPS system. Next, at step 715, the requestor generates a request containing the first entity's location. Illustratively, the request is a SIP SUBSCRIBE message that contains the acquired location of the first entity. At step 720, the requestor forwards the request to the second entity.

The second entity receives the request, at step 725 and acknowledges it at step 730. Illustratively, the acknowledgement is a SIP "200 OK" message that indicates the SUBSCRIBE message has been received. At step 735, the second entity then locates the requested ancillary information using the location of the first entity specified in the request.

At step 740, a check is performed to determine if the requested ancillary information has been located. If not, at step 745, a response indicating an error condition is generated and the sequence proceeds to step 755; otherwise, a response containing the located ancillary information is generated (step 750). Illustratively, the response is a SIP NOTIFY message that indicates either an error condition or contains the requested ancillary information depending on whether the ancillary information was located. At step 755, the response is forwarded to the requester. Next, at step 760, the requester receives the response from the second entity and, at step 760, acknowledges the response. The sequence ends at step 795.

For example, referring to FIGS. 1 and 7, assume that communication unit 200a wishes to obtain a URI associated with a PSAP that services the communication unit's geographic location. Communication unit 200a determines its location (step 710) by querying the DHCP server 160 for its location information. Specifically, communication unit 200 issues a DHCP message 500 to the DHCP server 160 which responds with a DHCP message 500 having a coordinate LCI option 540 that contains the geographical location information (e.g., latitude, longitude and altitude) of communication unit 200a.

After it has determined its location, communication unit 200a generates a SIP SUBSCRIBE message (request) that contains its geographical location and specifies that the communication unit is requesting the URI of a PSAP that services its location (step 715). Communication unit 200a then forwards the request to the information server 300 (step 720). Specifically, the request is generated by the communication unit's processor 230 (FIG. 2) and forwarded via the RF transceiver 260 to the access point 110a via wireless link 150a. Access point 110a receives the request and forwards it to intermediate node 180a. The intermediate node 180a then forwards the request to the information server 300 via network 190.

The information server 300 receives the request (step 725) and acknowledges it (step 730) with a SIP "200 OK" message. Specifically, the subscribe message is received by the information server's network interface 380 (FIG. 3) and forwarded to the information server's processor 330. The processor 330 generates the "200 OK" message and forwards it to the communication unit 200a via network interface 380. The "200 OK" message travels via the network 190 and is eventually received by intermediate node 180a. Intermediate node 180a forwards the message to access point 110a which transmits the "200 OK" message to the communication unit 150a. Communication unit 200a receives the "200 OK" message and processes it accordingly.

At step 735, the processor 330 queries database 400 using the location of communication unit 200a specified in the subscribe message to locate an entry 410 whose location value 420 matches the location specified in the subscribe message. Assume a matching entry 410 is found (step 740) and that the information field 440 of the matching entry contains a value that represents a URI of the PSAP associated with the location represented in the matching location value 420. At step 750, the processor 330 generates a notify message (response) and places the information 440 associated with the matching entry 410 in the generated notify message. The notify message is then forwarded to communication unit 200a (step 755). Communication 200a receives the notify message (step 760) and responds by generating and forwarding a "200 OK" message to the server 300 (step 765). Communication unit 200a may then extract the PSAP URI from the received notify message to obtain the URI of a PSAP associated with its location.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for acquiring, at a first entity, public safety information related to a geographic location of the first entity, wherein the first entity is a communication unit in a Voice over Internet Protocol (VoIP) communication network, the method comprising:

generating, by the first entity, a Dynamic Host Configuration Protocol (DHCP) message requesting the geographic location of the first entity;

forwarding, by the first entity, the DHCP message to an external DHCP server;

receiving, at the first entity, a DHCP response from the DHCP server that comprises a DHCP location configuration information (LCI) option representing the geographic location of the first entity, wherein the LCI option comprises a code field, a length field, a latitude field, a latitude resolution field, a longitude field, a longitude resolution field, an altitude type field, an altitude field, an altitude resolution field, a datum field, and a field identifying a postal address of the first entity;

generating a request at the first entity to a trusted source server for a Uniform Resource Identifier (URI) or Uniform Resource Locator (URL) of a public safety access point (PSAP) that services the geographic location of the first entity wherein the request is a Session Initiation Protocol (SIP) SUBSCRIBE message and includes location information representing the geographic location of the first entity;

forwarding the request to a trusted source server considered a trustworthy source of information by the first entity, wherein the trusted source server is configured to use the geographic location of the first entity to locate a PSAP and verify that the PSAP services the geographic location of the first entity;

if the URI or URL of the PSAP is located by the trusted source server, receiving a SIP "200 OK" response message generated by the server containing the URI or URL of the PSAP that has been verified as servicing the geographic location of the communication unit; and establishing a VoIP call with the PSAP using the received URI or URL.

2. A method for providing public safety information to a communication unit related to a geographic location of the communication unit in a Voice over Internet Protocol (VoIP) communication network, the method comprising:

receiving a Dynamic Host Configuration Protocol (DHCP) message requesting the geographic location of the communication unit;

forwarding a DHCP response to the communication unit, wherein the DHCP response includes a DHCP location configuration information (LCI) option representing the geographic location of the communication unit, wherein the LCI option comprises a code field, a length field, a latitude field, a latitude resolution field, a longitude field, a longitude resolution field, an altitude type field, an altitude field, an altitude resolution field, a datum field, and a field identifying a postal address of the communication unit;

receiving a request for a Uniform Resource Identifier (URI) or Uniform Resource Locator (URL) of a public safety access point (PSAP) that services the geographic location of the communication unit, wherein the request is a Session Initiation Protocol (SIP) SUBSCRIBE message and includes location information comprising the geographic location of the communication unit, and wherein the communication unit considers a receiver of the request a trustworthy source of information;

attempting to locate the URI or URL of the PSAP using the location information;

if the URI or URL of the PSAP is located, verifying that the PSAP services the geographic location of the communication unit;

if the URI or URL of the PSAP is located, generating an SIP "200 OK" response message containing the URI or URL of the PSAP that has been verified as servicing the geographic location of the communication unit; and forwarding the SIP "200 OK" response message to the communication unit to enable establishment of a VoIP call with the PSAP using the URI or URL.

3. A method as defined in claim 2 further comprising:
if the public safety information is not located, generating a SIP response that indicates an error condition.

4. A trusted source server, considered a trustworthy source of information by a communication unit, for providing public safety information to the communication unit related to a geographic location of the communication unit in a Voice over Internet Protocol (VoIP) communication network, the server, comprising:

a network interface configured to receive a Session Initiation Protocol (SIP) SUBSCRIBE request from the communication unit for a Uniform Resource Identifier (URI) or Uniform Resource Locator (URL) of a public safety access point (PSAP) that services the geographic location of the communication unit, wherein the request includes Dynamic Host Configuration Protocol (DHCP) location configuration information (LCI) option representing the geographic location of the first entity, wherein the LCI option comprises a code field, a length field, a latitude field, a latitude resolution field, a longitude field, a longitude resolution field, an altitude type field, an altitude field, an altitude resolution field, a datum field, and a field identifying a postal address of the first entity, and wherein the DHCP location configuration information (LCI) option was received at the communication unit from an external DHCP server;

a processor configured to:
(a) attempt to locate the URI or URL of the PSAP using the location information,
(b) if the URI or URL of the PSAP is located, verify that the PSAP services the location of the communication unit;
(c) if the URI or URL of the PSAP is located, generate a SIP "200 OK" response message containing the URI or URL of the PSAP that has been verified as servicing the geographic location of the communication unit, and
(d) forward the SIP "200 OK" response to the communication unit to enable the communication unit to establish a VoIP call with the PSAP using the URI or URL.

5. A trusted source server as described in claim 4 wherein the processor is further configured to:
if the public safety information is not located, generate a SIP response that indicates an error condition.

6. A trusted source server as described in claim 4 further comprising:
an information data structure wherein the information data structure contains one or more entries wherein each entry contains location information that represents a location and public safety information related to the location represented by the location information in the entry.

7. A trusted source server as described in claim 6 wherein the processor is further configured to:
compare the location information contained in the request with the location information contained in entries of the data structure, and
if an entry contains location information that matches the location information in the request, conclude the public safety information has been located.

8. A trusted source server as described in claim 7 wherein the processor is further configured to:

place the public safety information contained in the matching data structure entry in the response.

9. A communication unit for acquiring public safety information related to a geographic location of the communication unit in a Voice over Internet Protocol (VoIP) communication network, the communication unit comprising:
a processor configured to:
　generate, by the communication unit, a Dynamic Host Configuration Protocol (DHCP) message requesting the geographic location of the communication unit;
　forward, by the communication unit, the DHCP message to an external DHCP server;
　receive a DHCP response from the DHCP server that comprises a DHCP location configuration information (LCI) option representing the geographic location of the first entity, wherein the LCI option comprises that comprises a code field, a length field, a latitude field, a latitude resolution field, a longitude field, a longitude resolution field, an altitude type field, an altitude field, an altitude resolution field, a datum field, and a field identifying a postal address and a datum field that collectively represent a the geographic location of the communication unit;
　generate a request for a Uniform Resource Identifier (URI) or Uniform Resource Locator (URL) of a public safety access point (PSAP) that services the geographic location of the communication unit wherein the request is a Session Initiation Protocol (SIP) SUBSCRIBE message and includes location information representing the geographic location of the communication unit,
　forward the request to a server considered a trustworthy source of information by the communication unit, wherein the trusted source server is configured use the geographic location of the communication unit to locate a PSAP and verify that the PSAP services the geographic location of the communication unit; and
a network interface configured to receive an SIP "200 OK" response message from the server including the URI or URL of the PSAP that has been verified as servicing the geographic location of the communication unit and configured to establish a VoIP call with the PSAP using the received URI or URL.

10. An apparatus for acquiring public safety information related to a geographic location of a communication unit in a Voice over Internet Protocol (VoIP) communication network, the apparatus comprising:
　means for generating a Dynamic Host Configuration Protocol (DHCP) message requesting the geographic location of the communication unit;
　means for forwarding the DHCP message to an external DHCP server;
　means for receiving a DHCP response from the DHCP server that comprises a DHCP location configuration information (LCI) option representing the geographic location of the first entity, wherein the LCI option comprises that comprises a code field, a length field, a latitude field, a latitude resolution field, a longitude field, a longitude resolution field, an altitude type field, an altitude field, an altitude resolution field, a datum field, and a field identifying a postal address of the communication unit;
　means for generating a request for Uniform Resource Identifier (URI) or Uniform Resource Locator (URL) of a public safety access point (PSAP) that services the geographic location of the communication unit wherein the request is a Session Initiation Protocol (SIP) SUBSCRIBE message and includes location information representing the geographic location of the communication unit;
　means for forwarding the request to an information server considered a trustworthy source of information by the apparatus, wherein the information server is configured use the geographic location of the communication unit to locate a PSAP and verify that the PSAP services the geographic location of the communication unit; means for receiving—an SIP "200 OK" response message from the information server containing the URI or URL of the PSAP that has been verified as servicing the geographic location of the communication unit; and
　means for establishing a VoIP call with the PSAP using the received URI or URL.

\* \* \* \* \*